United States Patent
Paulsen et al.

(10) Patent No.: US 11,462,827 B2
(45) Date of Patent: Oct. 4, 2022

(54) ELECTRONICALLY SCANNED ARRAY

(71) Applicant: Rockwell Collins, Inc., Cedar Rapids, IA (US)

(72) Inventors: Lee M. Paulsen, Cedar Rapids, IA (US); Thomas B. Campbell, Cedar Rapids, IA (US); Bryan S. McCoy, Cedar Rapids, IA (US); Adrian A. Hill, Vinton, IA (US); Dana J. Jensen, Marion, IA (US); Roger A. Dana, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/091,171

(22) Filed: Nov. 6, 2020

(65) Prior Publication Data

US 2021/0057815 A1 Feb. 25, 2021

Related U.S. Application Data

(62) Division of application No. 15/644,544, filed on Jul. 7, 2017, now Pat. No. 10,833,408.

(51) Int. Cl.
*H01Q 3/36* (2006.01)
*H01Q 3/40* (2006.01)
*H01Q 3/26* (2006.01)

(52) U.S. Cl.
CPC ............ *H01Q 3/36* (2013.01); *H01Q 3/267* (2013.01); *H01Q 3/40* (2013.01)

(58) Field of Classification Search
CPC ...... G01S 7/411; G01S 7/414; G01S 15/8927; G01S 13/4463; F41J 9/08; H01Q 3/24;

(Continued)

(56) References Cited

U.S. PATENT DOCUMENTS 4,788,449 A 11/1988 Katz
4,837,580 A * 6/1989 Frazita ............... H04B 1/74
                                                342/372

(Continued)

FOREIGN PATENT DOCUMENTS

JP          H1078178 A    3/1998
WO       2017065088 A1    4/2017

OTHER PUBLICATIONS

Circular, Hexagonal and Octagonal Array Geometries for Smart Antenna Systems Using Hybrid CFOOHC Algorithm by Montaser published IEEE year 2012 (Year: 2012).*

(Continued)

*Primary Examiner* — Erin F Heard
*Assistant Examiner* — Michael W Justice
(74) *Attorney, Agent, or Firm* — Suiter Swantz pc llo

(57) ABSTRACT

Systems and apparatuses include an electronically scanned array system including a power supply system, a radiating element subarray, a plurality of beamformer chips, and a plurality of control buses. The radiating element subarray includes active radiating elements, and between about one percent and about twenty percent reserve radiating elements distributed throughout the active radiating elements. Each control bus includes a plurality of primary control paths providing communication from the control bus to the beamformer chips, and a reserve control paths structured to be remapped to provide communication from the control bus to the beam former chips in the event that one of the plurality of primary control paths fails.

8 Claims, 9 Drawing Sheets

(58) Field of Classification Search
CPC .. H01Q 3/26; H01Q 3/02; H01Q 3/12; H01Q 3/36; H01Q 3/267; H01Q 3/40; H01Q 21/0025; H01Q 21/061; H01Q 19/22; H01Q 19/28; H04B 7/0617
USPC ........ 363/65, 67–70; 307/44, 64, 65, 82, 86, 307/87; 342/372, 374, 268, 173, 368
See application file for complete search history.

(56) References Cited

U.S. PATENT DOCUMENTS

| | | | |
|---|---|---|---|
| 5,027,126 A | 6/1991 | Basehgi et al. | |
| 5,654,859 A | 8/1997 | Shi | |
| 5,818,349 A | 10/1998 | Dayton | |
| 6,097,335 A | 8/2000 | Cassen et al. | |
| 6,140,976 A * | 10/2000 | Locke | H01Q 3/28 342/374 |
| 6,149,946 A | 10/2000 | Desrosiers et al. | |
| 6,208,287 B1 * | 3/2001 | Sikina | H01Q 3/267 342/372 |
| 6,252,542 B1 * | 6/2001 | Sikina | H01Q 3/267 342/174 |
| 6,288,673 B1 * | 9/2001 | Dolmeta | G01S 7/4004 342/372 |
| 6,351,237 B1 * | 2/2002 | Martek | H01Q 3/2682 342/361 |
| 7,509,141 B1 * | 3/2009 | Koenck | G06F 13/4256 370/387 |
| 7,570,209 B2 * | 8/2009 | Shi | H01Q 3/267 342/372 |
| 7,623,833 B2 * | 11/2009 | Cabrera | H04B 1/0483 455/118 |
| 8,149,166 B1 | 4/2012 | Buxa | |
| 8,395,917 B2 * | 3/2013 | Humphrey | H02M 3/1584 363/67 |
| 9,478,858 B1 | 10/2016 | West et al. | |
| 9,917,714 B2 * | 3/2018 | Mayo | H04L 1/206 |
| 10,433,184 B2 * | 10/2019 | Lee | H04W 64/003 |
| 10,944,490 B2 * | 3/2021 | Zhu | H04B 17/309 |
| 2005/0180079 A1 * | 8/2005 | Joseph Gaudreau | H02J 1/102 361/104 |
| 2007/0243836 A1 * | 10/2007 | Cabrera | H04B 1/0483 455/102 |
| 2010/0107004 A1 | 4/2010 | Bottelli et al. | |
| 2010/0107044 A1 | 4/2010 | Li | |
| 2011/0169522 A1 | 7/2011 | Raj et al. | |
| 2011/0273011 A1 | 11/2011 | de Wergifosse | |
| 2011/0313647 A1 | 12/2011 | Koebler et al. | |
| 2015/0124501 A1 * | 5/2015 | Dermark | H02J 3/46 363/65 |
| 2016/0204690 A1 * | 7/2016 | Shimomugi | H02M 1/32 361/18 |
| 2017/0063585 A1 * | 3/2017 | Mayo | H04L 27/2273 |
| 2017/0195893 A1 * | 7/2017 | Lee | H04W 64/003 |
| 2019/0013583 A1 | 1/2019 | Paulsen et al. | |
| 2020/0076517 A1 * | 3/2020 | Zhu | H01Q 3/267 |

OTHER PUBLICATIONS

Office Action for European Application No. 18075009.3 dated Nov. 2, 2020, 8 pages.
Office Action in Chinese Application No. 201810723597.0 dated Jul. 8, 2021 (12 pages).
European Action for EP Patent Application No. 18075009.3 dated Nov. 19, 2019.
European Search Report for EP Application No. 18075009.3 dated Oct. 31, 2018.
Extended Search Report for European Application No. 21192885.8 dated Feb. 2, 2022, 9 pages.
Jeon, et al., (2017). Fully Integrated on-Chip Switched DC—DC Converter for Battery-Powered Mixed-Signal SoCs. Symmetry. 9. 18. 10.3390/sym9010018.
Dftice Action in Korean Application No. Oct. 2018-0076299, dated Feb. 17, 2022, 12 pages (with English Translation).
Office Action in Japanese Application No. 2018-125877 dated Jun. 7, 2022, 11 pages (with English Translation).

* cited by examiner

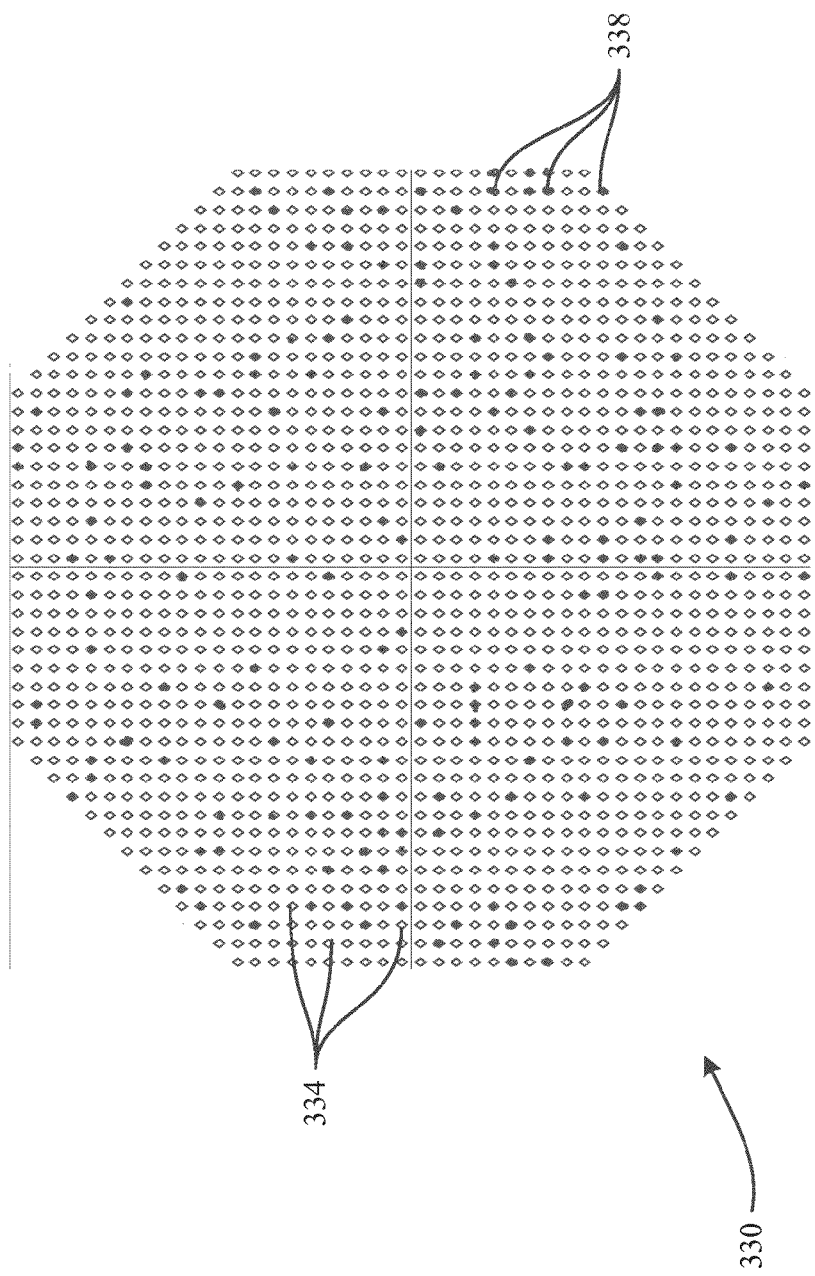

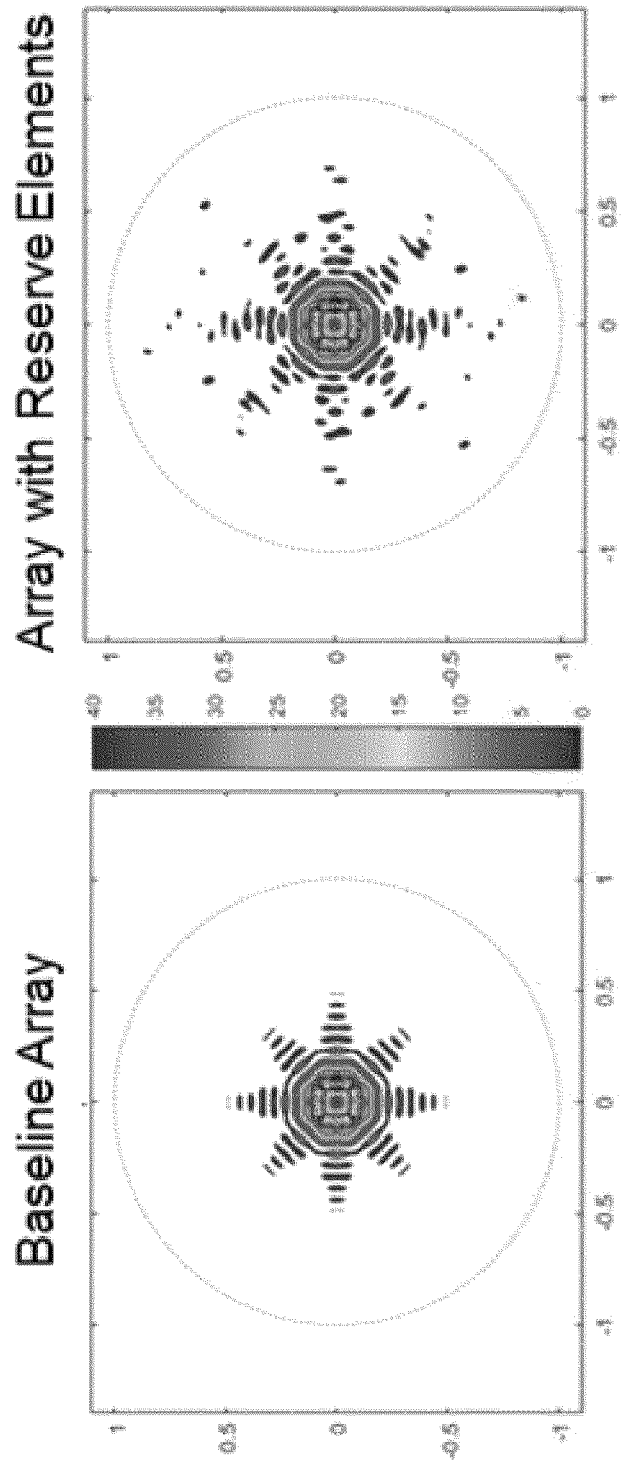

ELECTRONICALLY SCANNED ARRAY

CROSS REFERENCE TO RELATED APPLICATION

The present application is related to and claims benefit of the earliest available effective filing date from the following applications. The present application constitutes a divisional patent application of U.S. patent application Ser. No. 15/644,544, entitled Electronically Scanned Array, naming Lee M. Paulsen, Thomas B. Campbell, Bryan S. McCoy, Adrian A. Hill, Dana J. Jensen, and Roger A. Dana as inventors, filed Jul. 7, 2017. U.S. patent application Ser. No. 15/644,544 is incorporated by reference herein in its entirety.

BACKGROUND

The present disclosure relates generally to the field of satellite communication. More specifically, the present disclosure relates to airborne satellite communication. An electronically scanned array (ESA) is an antenna that can be electronically steered to point in different directions. As an ESA ages, individual radiating elements can fail. As the individual elements fail, the radiating performance of the ESA decreases proportionately.

A common sentiment about phased arrays (e.g., ESAs) is that they gracefully degrade as elements fail. In other words, most ESAs are designed with slow and proportional performance decay in mind. However, graceful decay does not always occur. Single point failure modes exist in ESA power supply architectures and controllers, and radiation element failures can require re-calibration and will reduce gain-to-noise-temperature (G/T) and effective-isotropic-radiated-power (EIRP) to below acceptable levels.

Various techniques can be used in an attempt to address single point failure modes and radiation element failures over time. For example, radio-frequency (RF) isolation techniques can include placing circulators or directional couplers between the phased array circuitry and the antenna's radiating elements to reduce RF failure mode effects on active components.

Another solution includes in-position calibration via loopback testing, calibration horns, etc. In-position calibration is intended to permit re-calibration of the ESA to meet sidelobe requirements but requires a high signal-to-noise-ratio (SNR) for in-position measurements and complicated pattern synthesis techniques that must be computed on the fly. The in-position calibration approach places a burden on the back-end radio/radar/sensor hardware to be able to enable these calibration modes, which may not be possible when integrating with existing equipment (e.g. a legacy modem).

SUMMARY

In one aspect, embodiments of the inventive concepts disclosed herein are directed to an apparatus that includes a connector structured to receive mains power from a vehicle, a first power converter structured to receive and condition the mains power, a second power converter arranged in parallel with the first power converter and structured to receive and condition the mains power, a conditioned power connector structured to receive conditioned power from the first power converter and the second power converter, a first switch arranged between the first power converter and the conditioned power connector and structured to selectively allow conditioned power to pass from the first power converter to the conditioned power connector, a second switch arranged between the second power converter and the conditioned power connector and structured to selectively allow conditioned power to pass from the second power converter to the conditioned power connector, and a controller structured to monitor the first power converter and the second power converter and to operate one of the first switch or the second switch to provide conditioned power to the conditioned power connector.

In a further aspect, embodiments of the inventive concepts disclosed herein are directed to an apparatus that includes a plurality of beamformer chips and a plurality of control buses. Each beamformer chip is associated with at least one radiating element and includes a control bus interface and a reserve input configured to be remapped into the control bus interface in the event that a signal within the control bus interface fails. The plurality of control buses are structured to provide instructions to the plurality of beamformer chips, and each control bus includes a plurality of primary control paths providing communication from the control bus to the control bus interface, and a reserve control path structured to be remapped to provide communication from the control bus to the control bus interface in the event that one of the plurality of primary control paths fails.

In a further aspect, embodiments of the inventive concepts disclosed herein are directed to an apparatus that includes an array of active radiating elements, and between about one percent and about twenty percent reserve radiating elements distributed throughout the active radiating elements.

In a further aspect, embodiments of the inventive concepts disclosed herein are directed to an electronically scanned array system that includes a power supply system, a radiating element subarray, a plurality of beamformer chips, and a plurality of control buses. The power supply system includes a connector structured to receive mains power from a vehicle, a first power converter structured to receive and condition the mains power, a second power converter arranged in parallel with the first power converter and structured to receive and condition the mains power, a conditioned power connector structured to receive conditioned power from the first power converter and the second power converter, a first switch arranged between the first power converter and the conditioned power connector and structured to selectively allow conditioned power to pass from the first power converter to the conditioned power connector, a second switch arranged between the second power converter and the conditioned power connector and structured to selectively allow conditioned power to pass from the second power converter to the conditioned power connector, and a controller structured to monitor the first power converter and the second power converter and to operate one of the first switch or the second switch to provide conditioned power to the conditioned power connector. The radiating element subarray includes a plurality of active radiating elements and between about one percent and about twenty percent reserve radiating elements distributed throughout the active radiating elements. Each beamformer chip is associated with at least one radiating element and includes a control bus interface and a reserve input configured to be remapped into the control bus interface in the event that a signal within the control bus interface fails. The plurality of control buses are structured to provide instructions to the plurality of beamformer chips, and each control bus includes a plurality of primary control paths providing communication from the control bus to the control bus interface, and a reserve control path structured to be remapped to provide communication from the control bus to the control bus interface in the event that one of the plurality of primary control paths fails.

BRIEF DESCRIPTION OF THE FIGURES

Exemplary embodiments will become more fully understood from the following detailed description, taken in conjunction with the accompanying drawings, wherein like reference numerals refer to like elements, and:

FIG. 8 is a front view of an octagonal satellite communication array including reserve radiating elements, according to some embodiments;

FIG. 9 is a graph showing a gain pattern of an octagonal satellite communication array that includes no reserve elements, according to some embodiments;

FIG. 10 is a graph showing a gain pattern of the octagonal satellite communication array of FIG. 8 including reserve elements, according to some embodiments;

DETAILED DESCRIPTION

Following below are more detailed descriptions of various concepts related to, and implementations of, methods, apparatuses, and systems for electronically scanned arrays (ESA). The various concepts introduced above and discussed in greater detail below may be implemented in any number of ways, as the concepts described are not limited to any particular manner of implementation. Examples of specific implementations and applications are provided primarily for illustrative purposes.

Referring to the figures generally, the various embodiments disclosed herein relate to systems, apparatuses, and methods for an ESA that include a primary power supply, transmit circuit cards, receive circuit cards, a transmit array of radiating elements, and a receive array of radiating elements. The primary power supply receives main power (e.g., from an aircraft's power grid), and provides power to two parallel power-factor-correction (PFC) converters that alter and/or convert the electrical energy to a desirable direct current (DC) voltage (e.g., 48 VDC). The output of each PFC converter is switched so that only one PFC converter is outputting voltage to the downstream system. In this way, the primary power supply is protected against single point failures.

Each of the transmit and receive circuit cards are structured to receive power from the primary power supply (e.g., at 48 VDC) and include a local power supply or power converter. Each local power supply includes two sets of converter components and each is switched so that only one set of converter components is providing power to the associated circuit card and/or array of radiating elements.

In addition to the power supply architecture, a control bus connecting each circuit card to the associated radiating elements includes a primary control bus and a secondary control bus. The primary and secondary control busses can be structured either in parallel or orthogonally and allow for continued operation and control in the event of a single point failure on the primary control bus.

The arrays of radiating elements themselves include reserve elements that are not operated or active when the array is new. The reserve elements can be activated as the array ages. This allows the ESA's performance to continue to meet desired specifications even after a significant number of individual radiating elements have failed. In addition, the transmit array and the receive array are constructed in an octagon shape and produce eight primary side lobes. As a result, the sidelobes each have a lower gain, and sidelobe gain levels are maintained in an acceptable range even as individual radiating elements fail.

Figure 1:
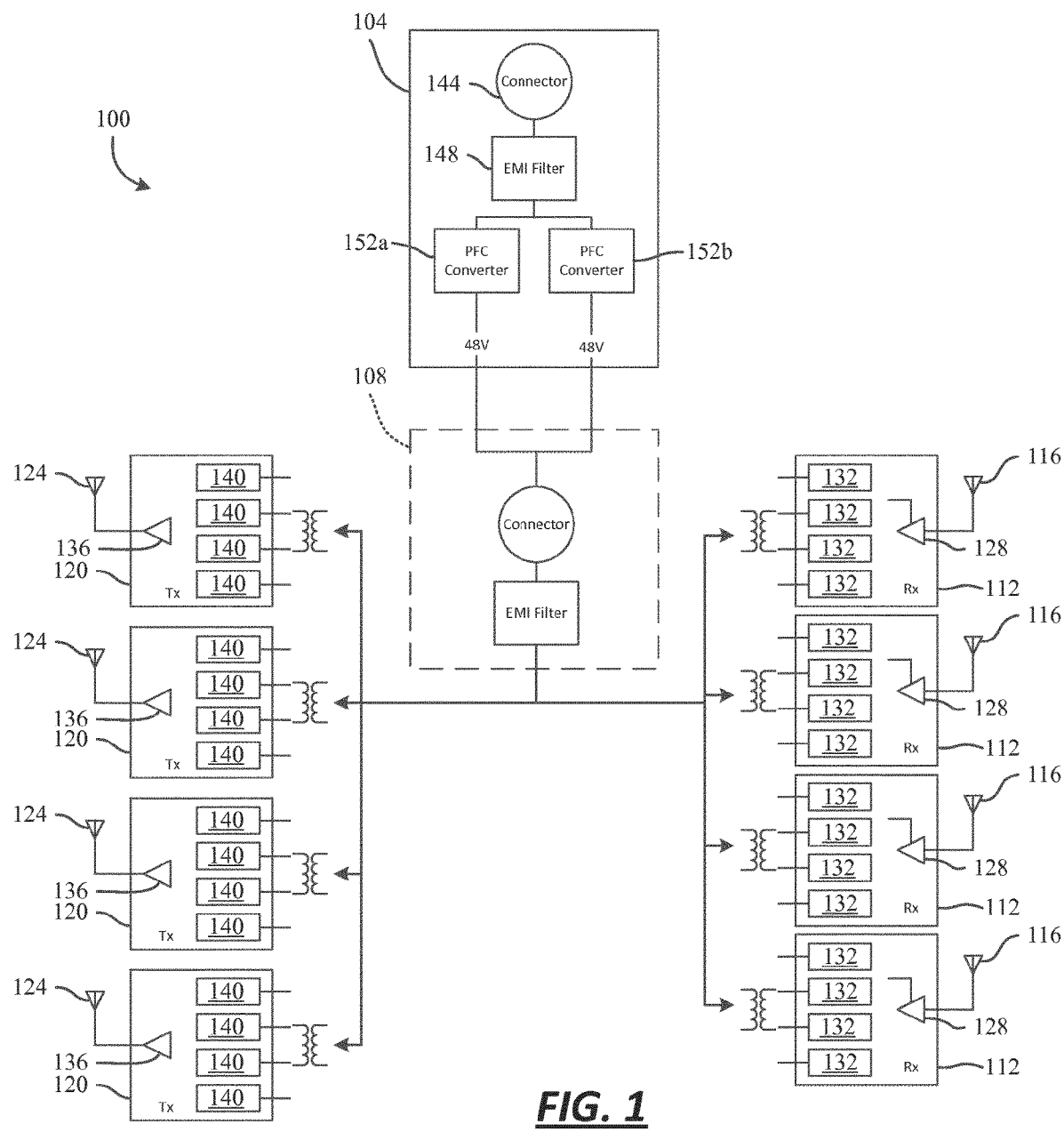
FIG. 1 is a schematic representation of an ESA power supply system, according to some embodiments.

Referring now to FIG. 1, an electronically scanned array (ESA) 100 includes a primary power supply 104 arranged within a vehicle (e.g., an aircraft), an external power distribution circuit 108 arranged outside the vehicle and receiving conditioned power from the primary power supply 104, four receive subarrays 112 each receiving power from the external power distribution circuit 108 and powering a set of radiating elements 116, and four transmit subarrays 120 each receiving power from the external power distribution circuit 108 and powering a set of radiating elements 124. In some embodiments, the external power distribution circuit 108 is omitted and power is provided to the receive subarrays 112 and the transmit subarrays 120 from the primary power supply 104. For example, the external power distribution circuit 108 may be omitted when the primary power supply 104 is located outside a pressure vessel (e.g., the body of an aircraft). In some examples, more than four or less than four transmit and receive subarrays 112, 120 are included. Four of each subarray 112, 120 are shown for exemplary purposes only.

Each of the receive subarrays 112 includes a beamforming network 128 and four circuit cards 132, each circuit card 132 including a local power source or power converter. Similarly, each of the transmit subarrays 120 includes a beamforming network 136 and four circuit cards 140, each circuit card 140 including a local power source or power converter. In some embodiments, the beamforming networks 128 of the receive subarrays 112 include amplifiers, low noise filters, splitters, and phase shifters or time delays designed to receive signals or data beams via the receive radiating elements 116. In some embodiments, the beamforming networks 136 of the transmit subarrays 120 include amplifiers, low noise filters, combiners, and phase shifters or time delays designed to transmit signals or data beams via the transmit radiating elements 124. In some embodiments, the beamforming networks 128, 136 control the polarity of signals, a time delay, a phase shift, or other aspects required for desirable beamforming. In some embodiments, each subarray 112, 120 includes less than four or more than four circuit cards 132, 140.

Figure 2:
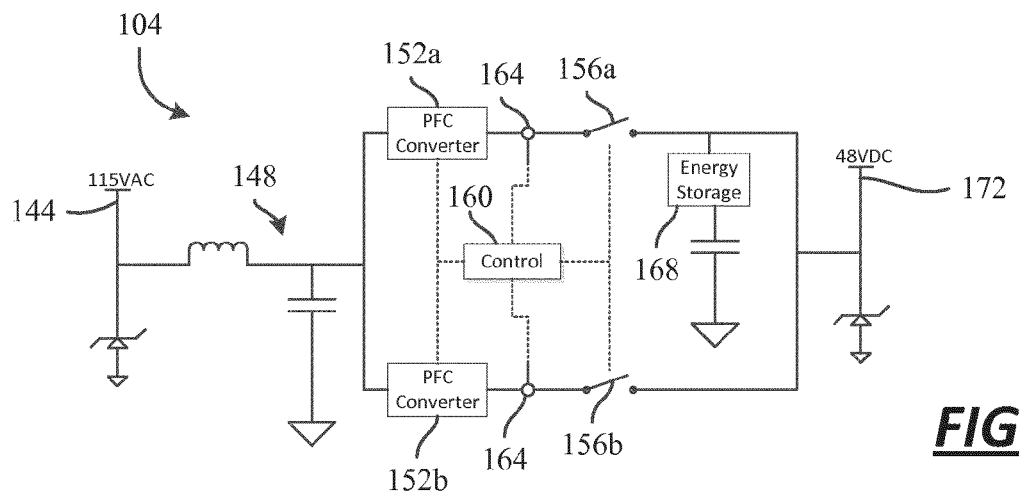
FIG. 2 is a schematic representation of a primary supply of the ESA power supply system of FIG. 1, according to some embodiments.

Referring now to FIG. 2, the primary power supply 104 receives mains power (e.g., 115 VAC) at a connector 144, passes the mains power through an EMI filter 148, before splitting in parallel to a first power factor correction (PFC) converter 152a and a second PFC converter 152b. Each PFC converter 152a,b adjusts the power factor of the mains power supply and transforms the voltage to a desired direct current voltage (e.g., 48 VDC). Downstream of the first PFC converter 152a is a first solid state current breaker (SSCB) 156a, and downstream of the second PFC converter 152b is a second SSCB 156b. The first SSCB 156a and the second SSCB 156b are controlled by a primary power source control 160. The primary power source control 160 communicates with diagnostic features in each PFC converter 152a,b and sensors 164 (e.g., current sensors) to determine a health of each of the PFC converters 152a,b and the associated power transmission circuits. In some embodiments, the primary power source control 160 closes the first SSCB 156a so that conditioned power is provided by the first PFC converter 152a. Should the primary power source control 160 determine that a problem has occurred with the first PFC converter 152a or the associate power transmission circuitry, then the first SSCB 156a is opened, and the second SSCB 156b is closed so that power is provided by the second PFC converter 152b. The parallel arrangement of the PFC converters 152a,b and the SSCBs 156a,b reduces the likelihood of a single point failure rendering the primary power supply 104 inoperable. In some embodiments, other sensors may be used to determine if current and/or conditioned power is being provided from the PFC converters 152a,b.

Downstream of the SSCBs 156a,b, an energy storage device 168 (e.g., a capacitor, a battery, etc.) is structured to receive and store conditioned power from one of the PFC converters 152a,b. The energy stored within the energy storage device 168 can be used to bridge a momentary drop out of power, supplement or replace the conditioned power provided by the PFC converters 152a,b during times of high energy usage, or provide longer term operation among other advantages. In some embodiments, a ship or aircraft's power drops out or fails momentarily. These drop outs are typically characterized by the ship or aircraft manufacturer, and occur as often as once per hour, for a duration of 50 to 250 milliseconds during normal flight as power is reconfigured on the aircraft. Playing through these momentary interruptions is desirable, so the computer doesn't need to reboot and the data link is not lost. A conditioned power connector 172 provides a connection point for the external power distribution circuit 108 or a power bus structured to connect directly to the subarrays 112, 120.

Figure 3:
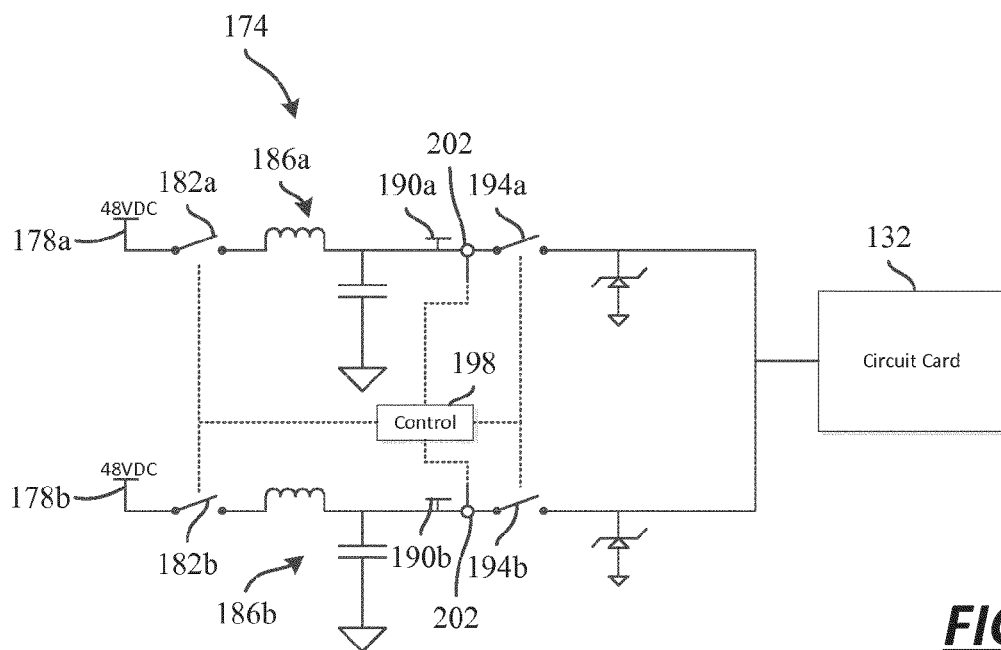
FIG. 3 is a schematic representation of a local supply of the ESA power supply system of FIG. 1, according to some embodiments.

Referring now to FIG. 3, a local power supply in the form of a local power converter 174 includes a first isolated input 178a and a second isolated input 178b that are structured to receive power from the primary power supply 104. In some embodiments, where the local power converter 174 is associated with a receive circuit card 132, the isolated power inputs 178a,b receive about 48 VDC and about 2.0 Amps of power. In some embodiments, where the local power converter 174 is associated with a transmit circuit card 140, the isolated power inputs 178a,b receive about 48 VDC and about 2.0 Amps of power. In some embodiments, the isolated power inputs 178a,b receive mains power, or the already conditioned power received at the isolated power inputs 178a,b can be considered mains power for the system.

In some embodiments, other voltage or current ratings may be provided, as desired to meet required specifications.

A first isolating switch or first SSCB 182a is arranged downstream of the first isolated power input 178a and a first EMI filter stage 186a is arranged downstream of the first isolating SSCB 182a. Downstream of the first EMI filter stage 186a is a first local power supply 190a that provides a local voltage and current arranged to be used by the associated circuit card 132. A second isolating switch or second SSCB 182b is arranged downstream of the second isolated power input 178b and a second EMI filter stage 186b is arranged downstream of the second isolating SSCB 182b. Downstream of the second EMI filter stage 186b is a second local power supply 190b that provides a local voltage and current arranged to be used by the associated circuit card 132. In some embodiments, the local power supplies 190a,b provide 2.5 VDC, 3.3 VDC, or another voltage, as desired. In some embodiments, multiple different voltages are provided.

Downstream of the first local power supply 190a is a first connection switch or first connection SSCB 194a structured to selectively interrupt power transmission from the first isolated power input 178a and the first local power supply 190a to the circuit card 132. A second connection switch or second connection SSCB 194b is positioned downstream of the second local power supply 190b and is structured to selectively interrupt power transmission from the second isolated power input 178b and the second local power supply 190b to the circuit card 132. A local control 198 controls the arrangement (e.g., open or closed) of the isolation SSCBs 182a,b and the connection SSCBs 194 a,b. The local control 198 is in communication with sensors 202 (e.g., current and voltage sensors) arranged between each local power supply 190a,b and each connection SSCB 194a,b. In some embodiments, the sensors 202 are a power supply monitor and include current sensing elements and voltage sensing elements. In some embodiments, the sensors 202 include more than one sensing component.

The local control 198 operates the isolation SSCBs 182a,b and the connection SSCBs 194a,b to provide power from one isolated power input 178a,b and one associated local power supply 190a,b at any given time to the circuit card 132. The inclusion of two isolated power inputs 178a,b and two local power supplies 190a,b structured on two independent power transmission paths reduces the likelihood of a single point failure on one power transmission path interrupting operation of the circuit card 132. If the local control 198 determines that one power transmission path has failed (e.g., the sensor 202 indicates no current), then the failed power transmission path is shut down by opening the associated isolation SSCB 182a,b and the connection SSCB 194a,b. Power transmission is restored by closing the other isolation SSCB 182a,b and connection SSCB 194a,b.

In some embodiments, each circuit card 132, 140 includes a local power converter 174 and the beamforming networks 128, 136 and associated radiating elements 116, 124 can be operated when the local power converters 174 are functional. The inclusion of parallel power transmission paths increases the operational availability of the subarrays 112, 120 and decreases the incidence of single point failures shutting down a system. Within the context of this application, availability means the ability to be functionally operational given a failure or sequence of failures. In some embodiments, equipment life is proportional to temperature and environmental conditions as well as design margins, and reliability is proportional to component count, etc.

Figure 4:
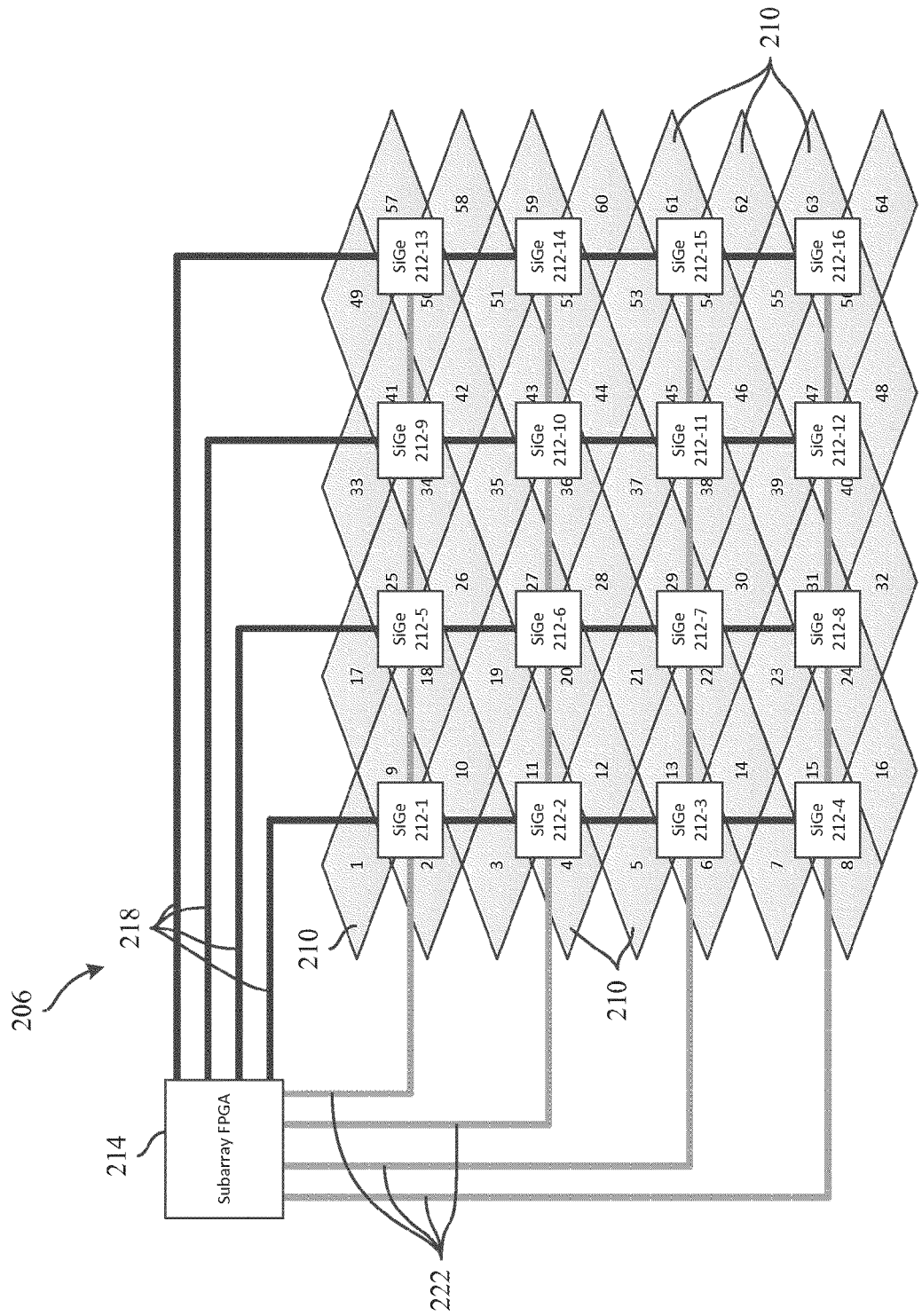
FIG. 4 is a schematic representation of an orthogonal control bus architecture feeding an array of radiating elements, according to some embodiments.

Referring now to FIG. 4, a subarray control system 206 includes sixty-four radiating elements 210, sixteen beamformer chips 212 each controlling four radiating elements 210, a subarray controller 214 structured to control the beamformer chips 212, a set of primary control buses 218, and a set of secondary control buses 222. In some embodiments, the beamformer chips 212 are SiGe chips. In some embodiments, the beamformer chips 212 can be created using CMOS (e.g., RF CMOS, SOI CMOS) and/or other integrated circuit processes. In some embodiments, the subarray controller 214 is a field programmable gate array (FPGA). In some embodiments, the subarray controller 214 is an application specific integrated circuit (ASIC), or another type of control block architecture. In some embodiments, each of the primary control buses 218 and the secondary control buses 222 is a serial interface bus.

The primary control buses 218 and the secondary control buses 222 are arranged orthogonally relative to one another such that each beamformer chip 212 can be controlled by either a primary control bus 218 or a secondary control bus 222. In some embodiments, if the primary control bus 218 providing communication between the subarray controller 214 and the beamformer chips 212-1 through 212-4 fails, then the four secondary control buses 222 arranged in communication with the beamformer chips 212-1 through 212-4 are assigned to carry the needed information. In some embodiments, more than sixty four or less that sixty four radiating elements 210 are included. For example, in some embodiments, five-hundred-twelve radiating elements 210 are included. In some embodiments, more than sixteen or less than sixteen beamformer chips 212 are included. In some embodiments, more than four or less than four primary control buses 218 and secondary control buses 222 are included. In some embodiments, the number of secondary control buses 222 may be different than the number of primary control buses 218.

Figure 5:
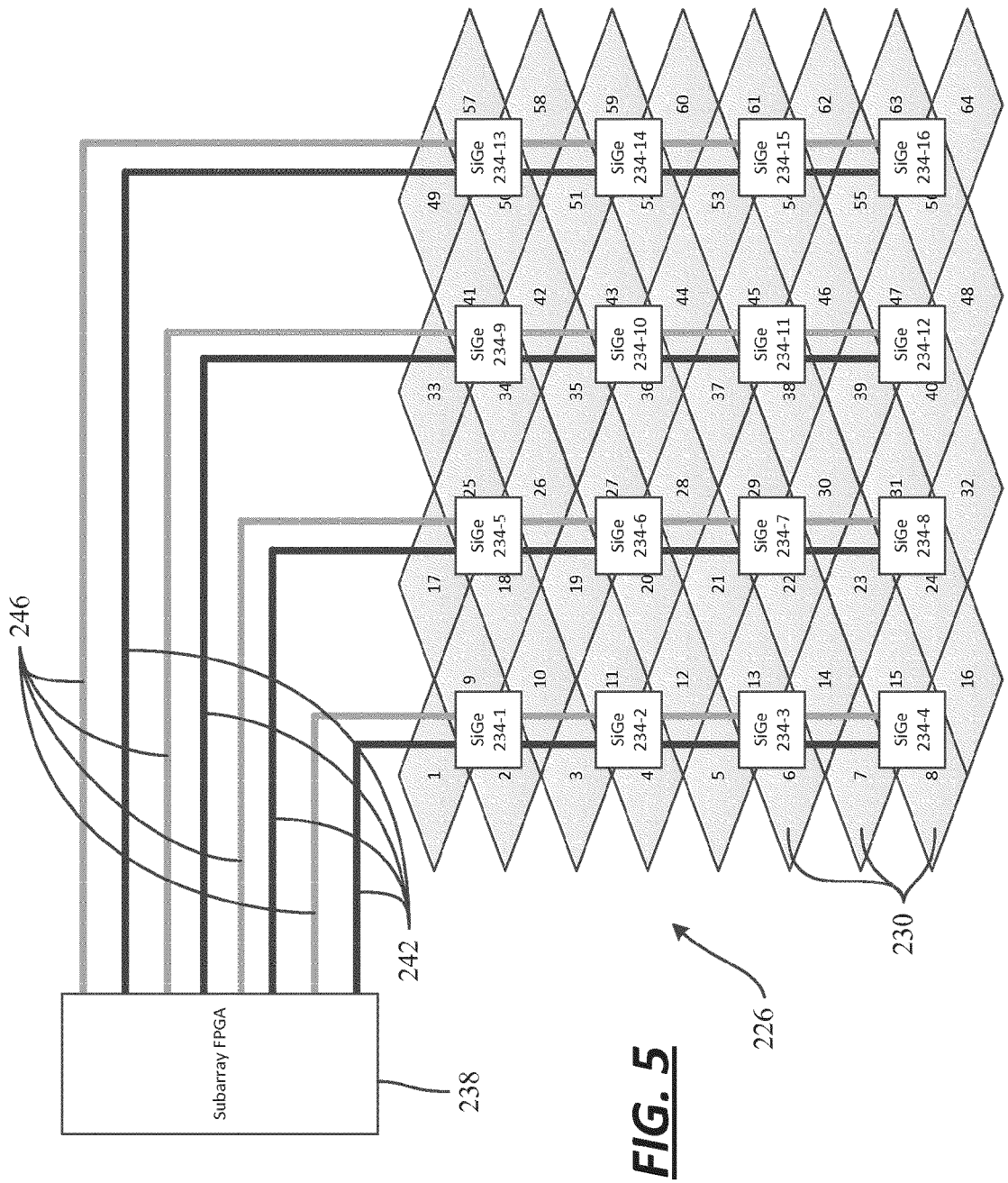
FIG. 5 is a schematic representation of a parallel control bus architecture feeding an array of radiating elements, according to some embodiments.

Referring now to FIG. 5, a subarray control system 226 includes similar parts to the subarray control system 206 described above and includes sixty-four radiating elements 230, sixteen beamformer chips 234 each controlling four radiating elements 230, a subarray controller 238 structured to control the beamformer chips 234, a set of primary control buses 242, and a set of secondary control buses 246. The primary control buses 242 and the secondary control buses 246 are arranged in parallel so that if one primary control bus 242 fails, the corresponding parallel secondary control bus 246 can be re-mapped to deliver information to the beamformer chips 234.

Figure 6:
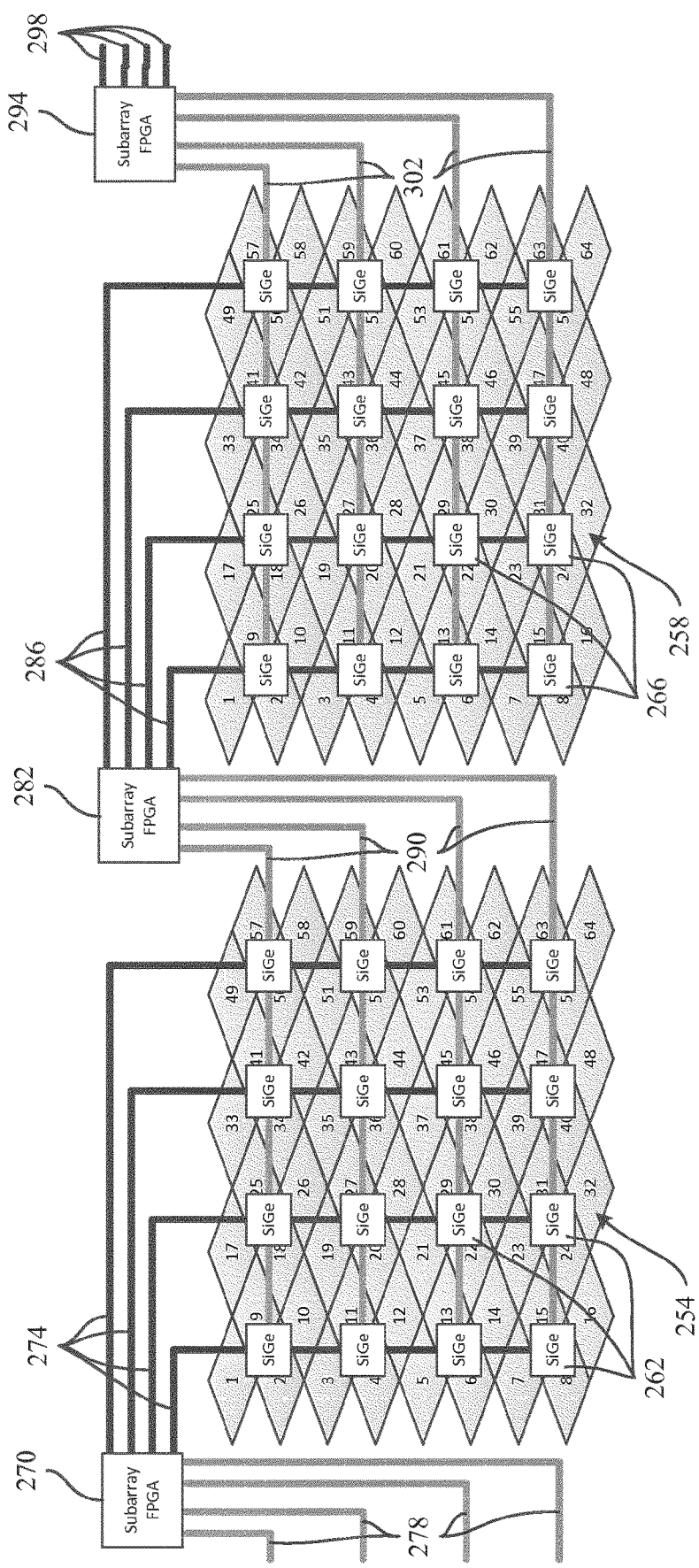
FIG. 6 is a schematic representation of another orthogonal control bus architecture feeding multiple arrays of radiating elements, according to some embodiments.

Referring now to FIG. 6, a subarray control system 250 includes a first subarray 254 including sixty-four radiating elements, a second subarray 258 including sixty-four radiating elements, sixteen beamformer chips 262 associated with the first subarray 254, sixteen beamformer chips 266 associated with the second subarray 258, a first subarray controller 270, a first set of primary control buses 274, a first set of secondary control buses 278, a second subarray controller 282, a second set of primary control buses 286, a second set of secondary control buses 290, a third subarray controller 294, a third set of primary control buses 298, a third set of secondary control buses 302. Each subarray controller 270, 282, 294 communicates with more than one subarray 254, 258. For example, the second subarray controller 282 is in communication with the first subarray 254 via the second set of secondary control buses 290, and the second subarray 258 via the second set of primary control buses 286. This arrangement allows broken or failed control buses to be remapped to other controllers while maintaining operation. For example, if one of the first set of primary control buses 274 were to fail, the second set of secondary control buses 290 can be remapped to provide the desired information. In another example, if the first subarray controller 270 were to fail, the second set of secondary control buses 290 can be remapped to control the first subarray 254 without the need for the first subarray controller 270. A large array of subarray controllers can be setup with orthogonal or parallel control bus redundancies so that a robust set of subarrays can be provided that will resist single point failures of both individual control buses and subarray controller failures.

Figure 7:
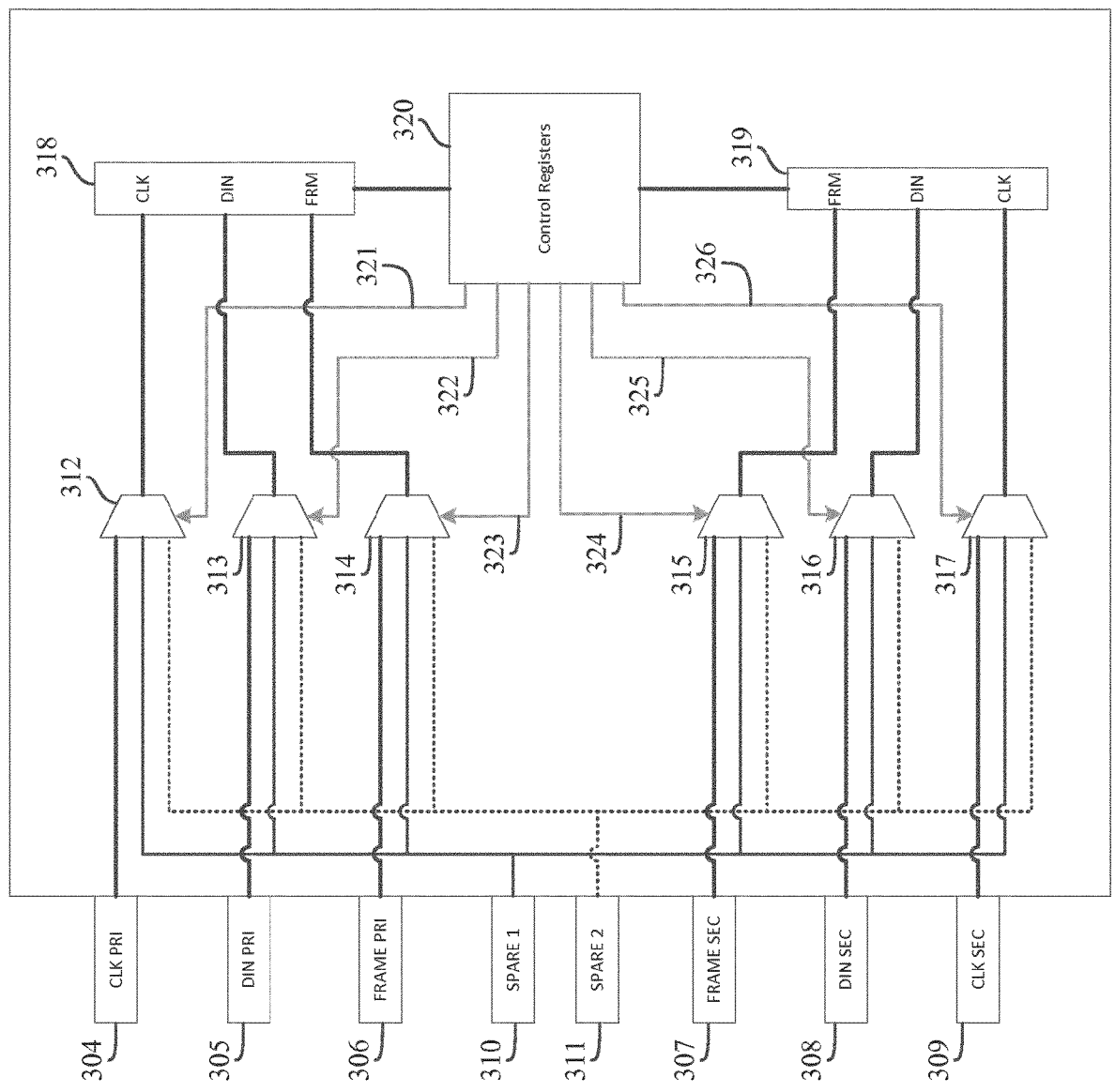
FIG. 7 is a schematic representation of a beamformer chip including bus interfaces and reserve control lines, according to some embodiments.

Referring now to FIG. 7, a subarray controller or beamformer chip 303 that includes a set of primary inputs or a primary control interface bus, a secondary set of inputs or a secondary control interface bus, and a spare set of inputs. The set of primary inputs can include a primary clock input 304, a primary data input 305, and a primary frame input 306. The set of secondary inputs can include a secondary frame input 307, a secondary data input 308, and a secondary clock input. The spare inputs can include a first spare input 310 and a second spare input 311. The primary clock input 304 is structured in communication with a first multiplexer 312, the primary data input 305 is structured in communication with a second multiplexer 313, the primary frame input 306 is structured in communication with a third multiplexer 314, the secondary frame input 307 is structured in communication with a fourth multiplexer 315, the secondary data input 308 is structured in communication with a fifth multiplexer 316, and the secondary clock input 309 is structured in communication with a sixth multiplexer 317. In some embodiments, the primary data input 305 and the secondary data input 308 are split into separate receive data and transmit data inputs and additional multiplexers are included to accept the data inputs.

The first spare input 310 is structured in communication with each of the multiplexers 312, 313, 314, 315, 316, 317. The second spare input 311 is also structured in communication with each of the multiplexers 312, 313, 314, 315, 316, 317. In some embodiments, more than two or less than two spare inputs are included. In some embodiments, the first spare input 310 is structured in communication with only the multiplexers receiving signals from the primary inputs, and the second spare input 311 is structured in communication with only the multiplexers receiving signals from the secondary inputs.

The first multiplexer 312, the second multiplexer 313, and the third multiplexer 314 are structured in communication with a control bus interface or first serial interface block 318. The fourth multiplexer 315, the fifth multiplexer 316, and the sixth multiplexer 317 are structured in communication with a control bus interface or second serial interface block 319. The first serial interface block 318 and the second interface block 319 are structured in communication with a control register block 320. The control register block 320 communicates with the multiplexers to control the data flow provided to the serial interface blocks 318, 319. A first control path 321 provides communication with the first multiplexer 312, a second control path provides communication with the second multiplexer 313, a third control path 323 provides communication with the third multiplexer 314, a fourth control path 324 provides communication with the fourth multiplexer 315, a fifth control path provides communication with the fifth multiplexer 316, and a sixth control path 326 provides communication with the sixth multiplexer 317.

Each of the multiplexers 312, 313, 314, 315, 316, 317 is arranged to receive three inputs (e.g. the first multiplexer 312 receives an input from the primary clock input 304, the first spare input 310, and the second spare input 311) and output one of the three data inputs to the associate serial interface block 318, 319. Which of the three data inputs is passed along is controlled via the associate control path (e.g., the first control path 321 in the case of the first multiplexer 312).

In operation, during normal functioning when no components have failed, the control register 320 receives the signals from the primary clock input 304, the primary data input 305, and the primary frame input 306. The control register 320 then communicates the received signals so that the associated radiating elements can be controlled. In the event of an input failure (e.g., the Primary clock input 304 fails), the control register 320 is controlled to receive and process signals from the secondary clock input 309, the secondary data input 308, and the secondary frame input 307 via the second serial interface block 319. The first spare input 310 is then remapped to provide the signal originally associated with the primary clock input 304. The control register 320 communicates with the first multiplexer 312 via the first control path 321 to select the signal from the first spare input 310 to be passed along to the first serial interface block 318. After the first spare input 310 has been remapped and the first multiplexer adjusted, then the control register again receives the signals from the first serial interface block 318 and continues normal operation. Similarly, the second spare input 311 can be remapped and used to replace another failed input. In some embodiments, the secondary inputs can be used as a replacement for the primary inputs.

The beamformer chip 303 has many advantages when used in a subarray and a plurality of arrays are including in an assembly. For example, each beamformer chip incorporates two or more control bus interfaces, each beamformer chip incorporates zero or more reserve or spare inputs which may be remapped to either/any control bus input in the event of a signal failure within a given bus, at the array level there are many control buses where each beamformer chip is connected to as many buses as it implements interfaces for, at the array level each control bus incorporates zero or more reserve signal paths, buses or lines which may be used as backups for the bus signals should a failure occur, at the array level the control buses may be arranged in an orthogonal manner relative to a given chip, and at the assembly level (multiple arrays), the control buses may be arranged to extend across array boundaries.

Referring now to FIG. 8, an antenna array 330 defines an octagonal shape. The array 330 is populated with active radiating elements 334 and reserve radiating elements 338 dispersed randomly throughout the array 330. Active radiating elements 334 are used by an associated beamforming network to transmit and receive signals. In some embodiments, about ten percent (10%) of the total number of radiating elements are reserve radiating elements 338 that are not operational when the array 330 is new. In some embodiments, between about one percent and about twenty percent of the total number of radiating elements are reserve radiating elements 338. In some embodiments, the array 330 is divided into tiles or sub tiles, and an even number of reserve radiating elements 338 are positioned in each sub tile. In some embodiments, the array 330 includes four sub tiles. In some embodiments, the array 330 can include more than four or less than for sub tiles. For example, three, six, eight, or nine sub tiles can be realized. In some embodiments, the reserve radiating elements 338 are positioned randomly within each sub tile. In some embodiments, the reserve radiating elements 338 are positioned in an even distribution throughout each sub tile. In some embodiments, active radiating elements and reserve radiating elements may be included on an array of a different shape. For example, square or rectangular arrays can include active radiating elements and reserve radiating elements.

The effective-isotropic-radiated-power (EIRP) of the array 330 and the gain of the array 330 are proportional to the number of active radiating elements 334 that are functional. As the array 330 ages, individual active radiating elements 334 will fail and no longer be operational. This failure leads to a reduction of the EIRP and gain. The inclusion of the reserve radiating elements 338 allows the operator or controller of the array 330 to activate reserve radiating elements 338 in response to failure of active radiating elements 334. In some embodiments, a controller identifies the nearest reserve radiation element 338 to a failed active radiating element 334 and remaps the control paths, buses or lines so that the nearest reserve radiating element 338 is activated. In some embodiments, the inclusion of about ten percent (10%) reserve radiating elements 338 doubles the MTBF of the array 330.

Referring now to FIG. 9, an octagonal array similar to the array 330 and including only active radiating elements (i.e., no reserve radiating elements) will produce a radiation pattern with a strong central lobe and eight side lobes that are about thirty decibels (~30 dB) lower than the central lobe. A standard square or rectangular array will typically include four side lobes. Increasing the number of side lobes has the effect of spreading the side lobe energy or radiation field so that each individual side lobe has a lower energy.

Referring now to FIG. 10 a radiation pattern produced by the array 330 when new and including about ten percent (10%) reserve radiating elements 338 is shown. The graph of FIG. 10 shows that the reserve radiating elements 338 introduce some pattern artifacts, but the energy of the side lobes is still acceptably low and the artifacts do not negatively affect the strong central lobe. Testing has shown that the radiation pattern and pattern artifacts remain constant as active radiating elements 334 fail and reserve radiating elements 338 are activated.

Figure 11:
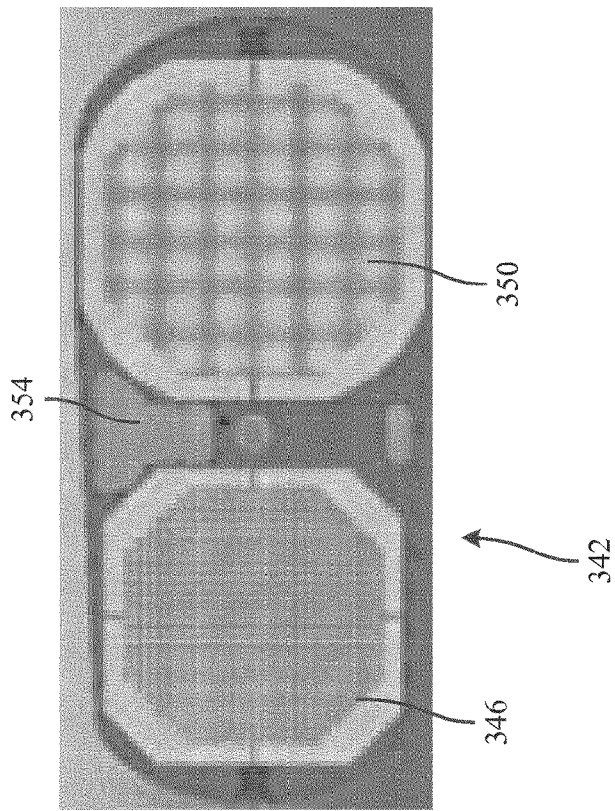
FIG. 11 is a top view of a phased array antenna system, according to some embodiments.
Figure 12:
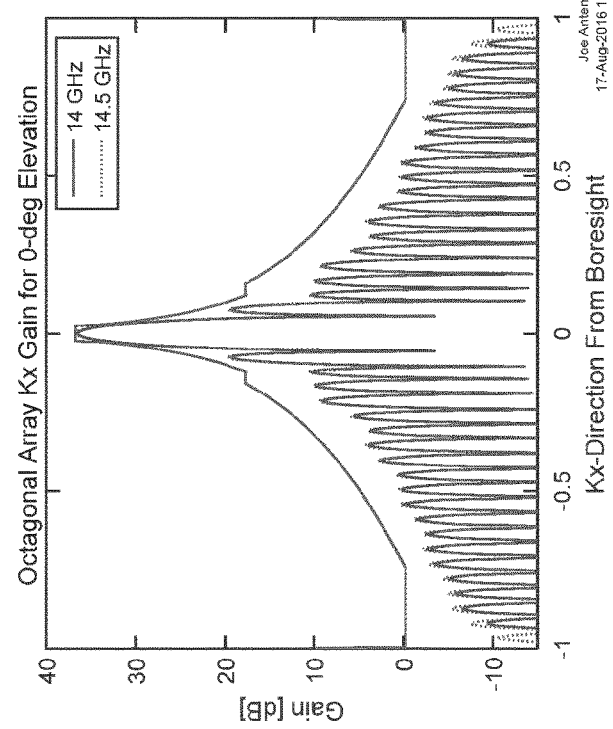
FIG. 12 is a graph showing sidelobe gain levels of the phased array antenna system of FIG. 11, according to some embodiments.

Referring now to FIG. 11, a satellite communication system 342 includes a transmit array 346, a receive array 350, and a control module 354 that controls the transmit array 346 and the receive array 350. Each of the transmit array 346 and the receive array 350 are octagonal in shape and provide the benefits described above with respect to FIG. 9. FIG. 12 shows a gain pattern produced by the octagonal arrays in comparison to a side lobe gain mask required by the FCC. As clearly shown in FIG. 12, the side lobe noise levels produced by these octagonal arrays are well below the required levels.

While the detailed drawings, specific examples, detailed algorithms and particular configurations given describe preferred and exemplary embodiments, they serve the purpose of illustration only. The inventions disclosed are not limited to the specific forms and reticles shown. For example, the methods may be performed in any of a variety of sequence of steps. The hardware and optical configurations shown and described may differ depending on the chosen performance characteristics and physical characteristics of the electronically scanned array and processing devices. For example, the type of system components and their interconnections may differ. The systems and methods depicted and described are not limited to the precise details and conditions disclosed. The specific mechanical components and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. An apparatus comprising:
    a plurality of beamformer chips, each associated with at least one radiating element and including a control bus interface and a reserve input configured to be remapped into the control bus interface in the event that a signal within the control bus interface fails;
    a subarray controller structured to control the plurality of beamformer chips; and
    a plurality of primary control buses structured to provide instructions from the subarray controller to the plurality of beamformer chips, and each including:
        a plurality of primary control paths providing communication from the subarray controller to the control bus interface, and
        a reserve control path structured to be remapped to provide communication from the subarray controller to the control bus interface in the event that one of the plurality of primary control paths fails;
    wherein the plurality of primary control buses and the plurality of secondary control buses are arranged in an orthogonal manner.

2. The apparatus of claim 1, wherein each of the plurality of beamformer chips include a control register block and one or more multiplexers configured to remap the reserve input into the control interface block.

3. The apparatus of claim 1, further comprising a plurality of secondary control buses; wherein each of the plurality of beamformer chips further comprise a secondary control bus interface; wherein the plurality of secondary control buses are configured to provide communication between the subarray controller and the secondary control bus interface of the plurality of beamformer chips in the event that one or more of the plurality of primary control paths of one or more of the plurality of primary control buses fails.

4. The apparatus of claim 3, wherein one or more of the plurality of secondary control buses provide communication between the subarray controller and the secondary control bus interface of the plurality of beamformer chips while the reserve control path is remapped into the control bus interface.

5. The apparatus of claim 1, further comprising:
    an additional subarray controller structured to control the plurality of beamformer chips; and
    a plurality of secondary control buses;
    wherein each of the plurality of beamformer chips further comprise a secondary control bus interface;
    wherein the plurality of secondary control buses are structured to provide instructions from the additional subarray controller to the secondary control bus interface of the plurality of beamformer chips, wherein the additional subarray controller is configured to provide communication from the additional subarray controller to the secondary control bus interface in the event that one of the plurality of primary control paths of the plurality of control buses fails.

6. The apparatus of claim 5, wherein one or more of the plurality of secondary control buses provide communication from the additional subarray controller to the control bus interface while the reserve control path is remapped.

7. The apparatus of claim 1, wherein each of the plurality of beamformer chips includes a primary clock input, a primary data input, and a primary frame input for the plurality of primary control paths.

8. The apparatus of claim 1, wherein each of the plurality of beamformer chips include a control register block, a first multiplexer in communication with the primary clock input and the reserve control path, a second multiplexer in communication with the primary data input and the reserve control path, and a third multiplexer in communication with the primary frame input and the reserve control path; wherein each of the first multiplexer, the second multiplexer, and the third multiplexer is configured to remap the reserve input into the control interface block.

* * * * *